No. 796,856. PATENTED AUG. 8, 1905.
E. O. C. ORD.
FURNACE.
APPLICATION FILED APR. 28, 1904.
5 SHEETS—SHEET 1.
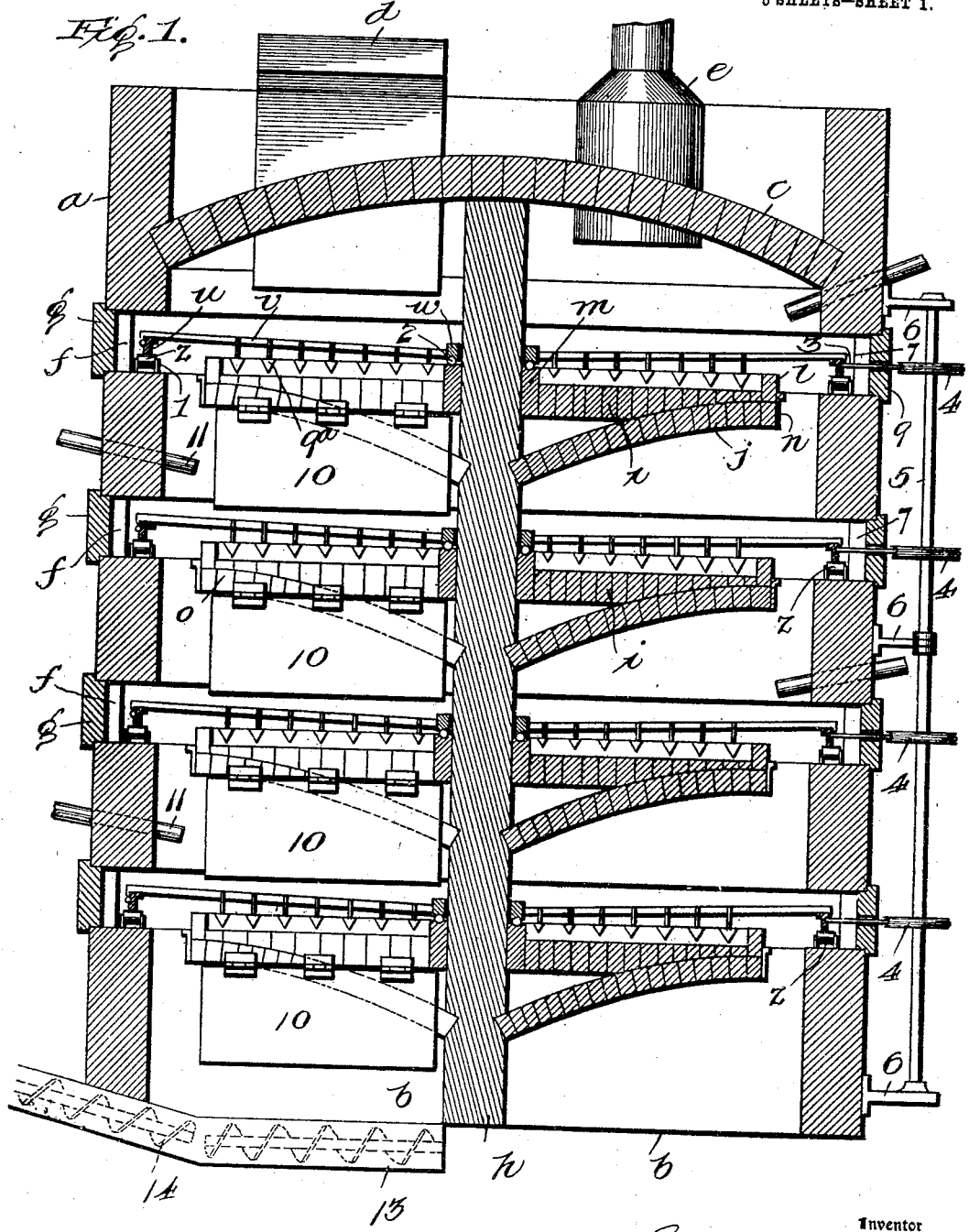

No. 796,856. PATENTED AUG. 8, 1905.
E. O. C. ORD.
FURNACE.
APPLICATION FILED APR. 28, 1904.
5 SHEETS—SHEET 2.
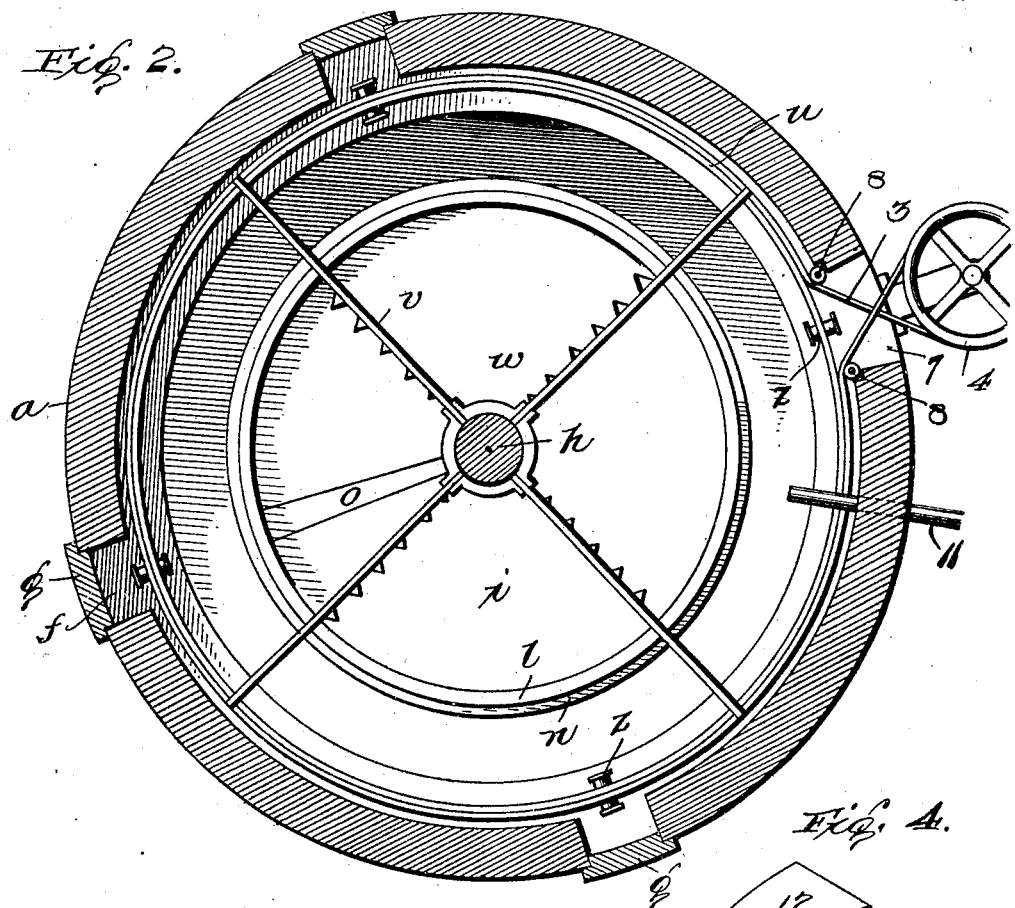
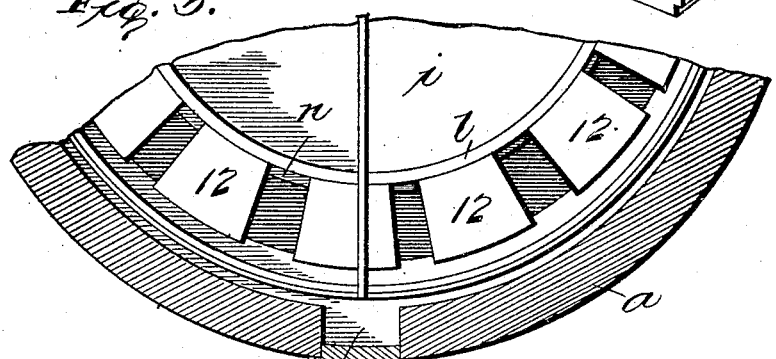

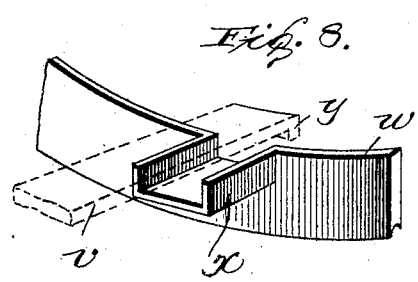
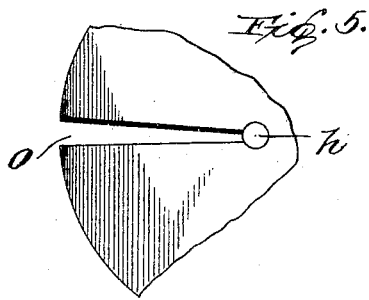
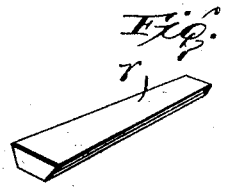
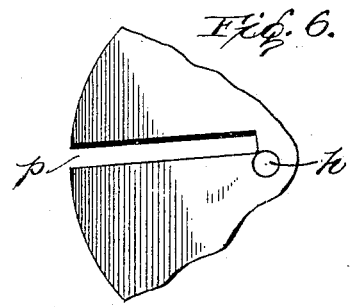
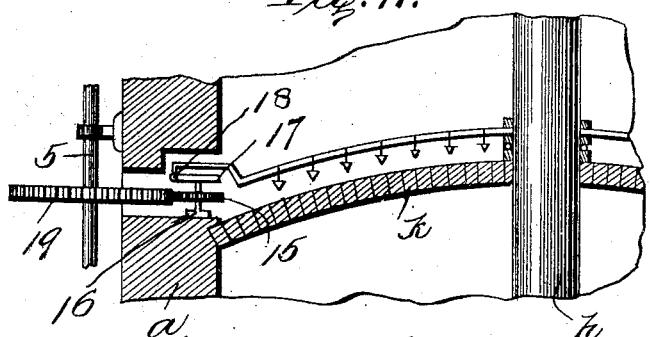
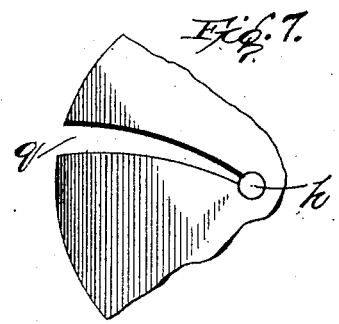
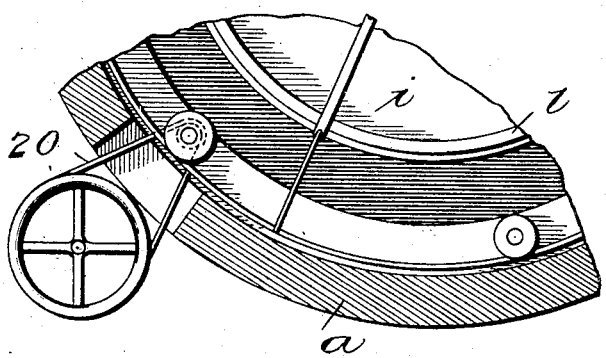

No. 796,856. PATENTED AUG. 8, 1905.
E. O. C. ORD.
FURNACE.
APPLICATION FILED APR. 28, 1904.

5 SHEETS—SHEET 4.

Witnesses
J. L. McCabe
W. Max. Duvall

Inventor
E. O. C. Ord.
By Wilkinson & Fisher
Attorneys.

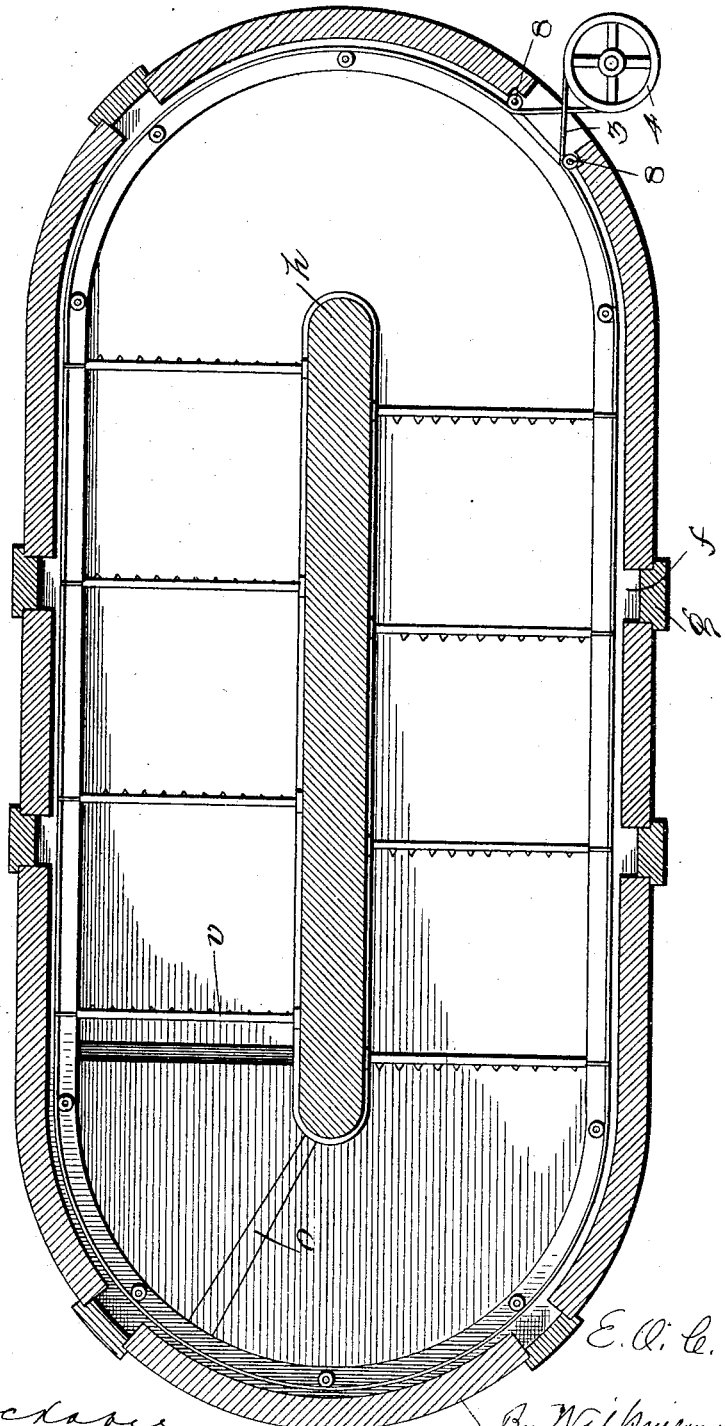

UNITED STATES PATENT OFFICE.

EDWARD O. C. ORD, OF WASHINGTON, DISTRICT OF COLUMBIA.

FURNACE.

No. 796,856.           Specification of Letters Patent.          Patented Aug. 8, 1905.

Application filed April 28, 1904. Serial No. 205,432.

*To all whom it may concern:*

Be it known that I, EDWARD O. C. ORD, a citizen of the United States, and a resident of Washington, District of Columbia, have invented certain new and useful Improvements in Furnaces, of which the following is a full and clear description, reference being made to the accompanying drawings, forming part of the specification.

My invention relates to furnaces for calcining or roasting ores or for drying minerals or other substances, and is especially designed for desulfurizing and roasting metallic ores.

The object of my invention is to provide a simple, cheap, and easily-constructed roasting-furnace, one that will work automatically and which is designed to overcome various defects of the ore-roasting furnaces now commonly in use.

With these objects in view my invention consists in the construction and combinations of parts as hereinafter described and claimed.

Figure 13:
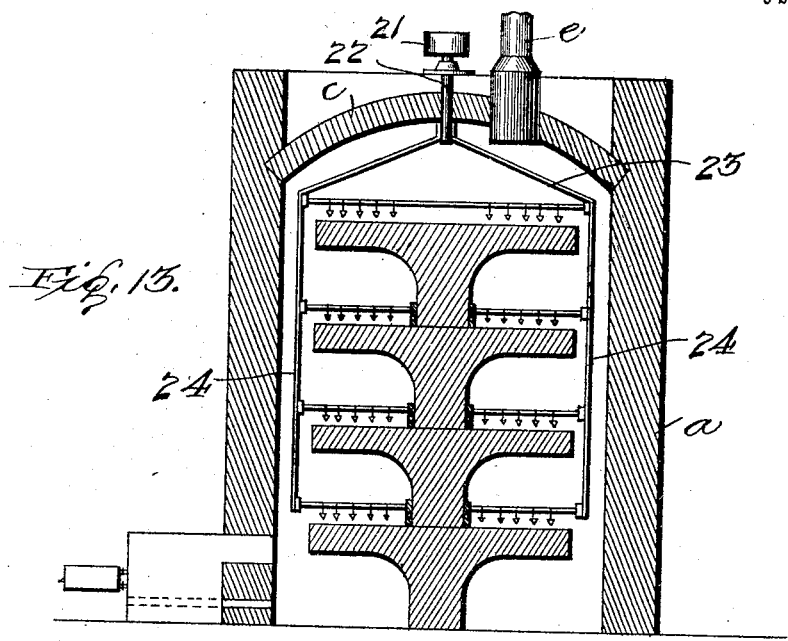
Figure 14:
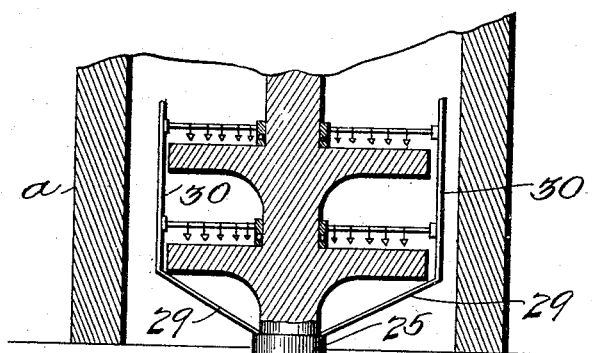

In the accompanying drawings, Figure 1 is a vertical section of my improved roasting-furnace. Fig. 2 is a horizontal cross-section of the same. Fig. 3 is a cross-section of a part of the furnace, showing some of the baffle-plates in position. Fig. 4 is a perspective view of one of the baffle-plates. Fig. 5 is a top plan view of a part of one of the roasting-hearths, showing the radial discharge-opening. Fig. 6 is a similar view showing the discharge-opening of a different shape, but similarly located. Fig. 7 is a similar view showing a curved discharge-slot instead of a straight discharge-slot. Fig. 8 is a perspective view of a part of the central collar which supports the inner ends of the rabble-carrying frame. Fig. 9 is a perspective view of a stop-piece used to close the discharge-slot shown in Fig. 5 in one of the hearths. Fig. 10 is a perspective view of a modified form thereof. Fig. 11 is a vertical cross-section of a part of the furnace, showing an arched hearth instead of a flat hearth and a modified form of the means for driving the rabbles. Fig. 12 is a horizontal cross-section of a portion of the same, showing still another modification of means for driving the rabbles. Fig. 13 is a vertical section of a furnace, showing a modification of the means for driving the rabbles, power being applied from above. Fig. 14 is a sectional view of a part of a furnace, showing the power to drive the rabbles applied from below; and Fig. 15 is a horizontal section of a furnace, showing the hearth of an elliptical form.

My roasting-furnace may be composed of a single hearth or of a series of hearths arranged one above another. These hearths may be circular, as shown in Fig. 1, elliptical, as shown in Fig. 15, or of any desired shape. The furnace is preferably constructed with an open space extending completely around between the inclosing wall or shell and each hearth. There is a radial opening in the bottom of each hearth with a swinging apron at one edge thereof. Each hearth is provided with revoluble rabbles which are caused to revolve around the center of the hearth by means of power applied to the outer part of the rabble-supporting frame, this being one of the important features of my invention, the power being communicated by wire ropes or chains or gearing passing in through the side of the furnace from an outside pulley-shaft. The rabbles are supported on a frame, which frame is supported at its inner and outer ends on rollers or ball-bearings. The rabble-arms are provided with blades or plows which are made to pass through and move along the ore upon one of the hearths of the furnace, thereby stirring it and finally discharging it through the opening in said hearth, thus making the ore travel from an upper hearth to each succeeding hearth below into a hopper located at the bottom of the furnace, from which hopper the material is removed by suitable conveyers.

The furnace is provided with an automatically-operating hopper in the roof thereof for receiving and discharging the ore onto the upper hearth and also with an outlet for the smoke and fumes, which outlet is located in the roof of the furnace, which roof is made of arched masonry. The walls of the furnace are provided with closable openings opposite and slightly above the floor of each hearth for the purpose of observing the operation of a furnace and for removing, changing, or repairing the rabbles.

The furnace is also provided with openings through which the wire rope or other gearing communicates power to the rabble-frames. It is also provided with one or more pipes located above each hearth for the purpose of directing flame and hot gases upon the contents of that hearth.

The furnace is further provided with closing rim-pieces or baffle-plates which are used for the purpose of closing the whole or part of the space between the inclosing wall and any one of the hearths, as may be desired, and to direct and control the currents of heat and smoke as they pass through the furnace. The furnace may be built of metal in sections lined with fire-brick for convenience in transportation.

In the accompanying drawings, $a$ represents the wall of a furnace provided with openings $b$, at the bottom thereof, for the introduction of flame and heat and with an arched roof $c$, made of masonry. Through the roof projects the hopper $d$, which is arranged to automatically deliver a charge of ore onto the upper hearth at each revolution of the rabble-frame by any of the ordinary means. (Not shown.)

$e$ represents a hollow conveyer which passes through the roof $c$ to convey off the smoke and fumes.

The furnace is provided with observation-openings $f$, adapted to be closed by the removable closures $g$, through which openings the operation of the furnace may be observed and the parts removed for change or repair. Preferably one of these openings is located at or slightly above the level of each one of the hearths.

Within the furnace is located a central stationary pillar $h$, which may be of masonry or fire-brick or of metal covered with some heat-resisting material, which supports the various hearths. In Fig. 1 this is shown as a cylindrical pillar and in Fig. 15 as a wall. This central support $h$ may be made hollow or solid, as preferred.

On the central support $h$ are mounted a number of hearths $i$. These hearths may be made circular, as shown in Fig. 1, elliptical, as shown in Fig. 15, or of any desired shape. The furnace may include a number of hearths arranged one above the other, as shown in Figs. 1, 13, and 14, or a single hearth, as desired. The hearths are made of any suitable material; but of course their surfaces must be composed of heat-resisting material. Inclined braces $j$, which spring out from the central pillar, are preferably used to support the hearths, or the hearths themselves may be arched, as shown at $k$ in Fig. 11. Usually I prefer to build the hearths with a continuous space extending between the inclosing wall and the outer edges of the hearths and extending completely around the furnace, although in the construction shown in Fig. 11 such an opening is not shown. In case the construction shown in Fig. 1 is used I prefer to have the outer edge of the furnace $l$ elevated to keep the ore from falling over the edge thereof, and the inner edge is provided with a ring or collar $m$, which supports the inner ends of the rabble-carrying frame. In Fig. 1 I have shown the hearths $i$ and arched supports $j$ as made of brick, and in such cases I provide an inclosing metal ring $n$ to keep the parts in their proper relative position. Each of the hearths is provided with a radially-arranged opening, various forms of which are shown at $o$, $p$, and $q$ in Figs. 5, 6, and 7, which openings may be closed by similarly-shaped closing-pieces provided with downward bevels, as shown at $r$ and $s$ in Figs. 9 and 10.

The rabble-carrying frame is best shown in Figs. 1 and 2. As shown in those figures, it consists of a circular L-shaped piece of metal $u$, to which the rabble-carrying arms $v$ are secured. The inner ends of the arms $v$ are supported in the collar $w$, (shown in detail in Fig. 8,) which collar is provided with projecting recessed arms $x$, provided with rims, within which the arms $v$, which are preferably made flattened, as shown in Fig. 8, fit. Each of the arms $v$ is provided with a projection $y$, which fits within the collar, thus holding the rabble-carrying arms firmly in contact with the collar. The arms $v$, however, may be of any desired shape—circular, for example, as shown in Figs. 1 and 2, the inner ends entering in the projections in the collar $w$, although the form shown in Fig. 8 is preferred.

The metal collar $u$ is supported by and travels upon rollers $z$, carried in supports 1, located in recesses in the wall $a$ of the furnace. The inner collar $w$ is supported on antifriction balls or rollers 2, which run in grooves in the collars $m$ and $w$.

In the form shown in Figs. 1 and 2 the power is applied directly to the metal ring $u$ by means of a metal cord or chain 3, which passes around the pulley 4, located on the upright shaft 5, which is supported in brackets 6, attached to the walls of the furnace and which may be driven in any suitable manner by means not shown.

In the modification shown in Fig. 1 all the rabble-carrying frames are shown as being driven at equal rates of speed, the pulleys 4 being all of the same size and driven by the same shaft; but, if desired, different-sized pulleys may be used to drive these frames.

The ropes 3 pass out through openings 7 in the wall of the furnace, being guided by pulleys 8, as shown in Fig. 2. These openings 7 may be partially closed by closing-pieces 9, which are apertured for the passage of the driving-rope.

The rabble-carrying arms $v$ are provided with a series of downwardly-projecting arms, which carry the plows $9^a$, preferably of the shape of small cultivator-plows, which stir the ore and gradually convey it to the discharge-opening in the hearth, unless said opening has been closed by means of one of the pieces $s$ or $t$. These plows, as shown in Fig. 1, are preferably regularly graduated in size, the largest being outside, and on the respective arms $v$ they are so arranged, as shown in Fig. 2, as not to travel in the same paths, being located at different distances from the central supporting-ring $w$, which arrangement insures a thorough stirring up of the ore.

On one edge of each of the openings in each of the hearths is hinged a swinging apron 10, which may hang vertically, as shown in Fig. 1, or which may be adjusted by any suitable means, (not shown,) so that the ore will be discharged from one hearth just behind the opening in the hearth just below, the first arrangement being used when it is desired to rapidly remove the ore from all the hearths in discharging the furnace and the second arrangement being used in the ordinary operation of roasting.

The furnace is supplied with heat through the openings $b$, and, furthermore, pipes 11, one being preferably arranged over each hearth, and inclined downwardly toward said hearth may be used to convey hot gases onto the hearths. Either one or both of such heating means may be used at the same time. Oftentimes I find it desirable to wholly or partially close the opening between the hearths $i$ and the wall of the furnace, and this is accomplished by means of the rim-pieces or baffle-plates 12, (see Figs. 3 and 4,) which are provided with projecting edges which fit over the upper part of the ring $n$ and the projections on the wall or shell of the furnace. By the means stated the amount of heat supplied and the currents of heated gases may be exactly and economically regulated. When the ore or other material has been thoroughly roasted, it falls from the lowest hearth into a hopper 13, from whence it is conveyed by any suitable means—such as the screw conveyers 14 shown in dotted lines in Fig. 1—to a suitable receptacle.

In Fig. 11 a different form of driving means for the rabble-carrying arms is shown. The shaft 5 is provided with a series of gear-wheels 19, which mesh with gear-wheels 15, supported on standards 16, located in the wall or shell of the furnace. On the top of each standard 16 is fixed a curved driving-pulley 17, which, as shown in Fig. 11, is grooved on its outer surface and engages with a ring 18, to which the rabble-carrying arms are fixed. Instead of the gear-wheels 19 and 15 a cord-drive 20 may be used, as shown in Fig. 12.

In the modifications thus far described the power is applied through apertures in the sides of the furnace. In Fig. 13, however, the power is applied to a pulley 21, located on a shaft 22, which passes through the roof of the furnace. To this shaft 22 are fastened inclined arms 23, and to the arms 23 are attached the vertical rods 24, to which the rabble-carrying arms are attached, the construction being otherwise as heretofore described.

In the modification shown in Fig. 15 the power is applied at the lower end of the furnace, the supporting-pillar $h$ having thereon a collar 25, provided with a bevel gear-wheel 26, which meshes with a similar gear-wheel 27 on the power-shaft 28. To the collar 25 are fastened the inclined arms 29, which carry the vertical rods 30, to which the rabble-arms are secured.

In the modification shown in Fig. 15 an elliptical hearth is shown instead of a circular hearth; but otherwise the construction is substantially as already set forth.

The furnace above described has many evident advantages over those now in use, the principal advantages being the following: The furnace can be made of one or more hearths, of any desired shape, placed one above the other, and in the case of a series of such hearths the openings therein are so arranged that the rakes or rabbles which revolve above the hearths may be made to empty the furnace of its entire contents very quickly, the discharging-aprons being allowed to hang vertically. The rakes on the floor of each hearth may have different rates of speed given to them without increasing the steam-pressure by the use of different-sized pulleys on the shaft. This is useful with different kinds and classes of ores. For instance, the ore on the upper hearth which has just been put into the furnace may be heavily sulfureted, requiring a slow motion of the rakes and requiring that the ore shall remain for a long time on each hearth, or in case of very rich ores the ore under treatment may require very slow and careful handling to prevent loss of the precious metals during the roasting process. As such ore is allowed to pass from one hearth to another the rakes may be given a slow motion on each hearth, while at the same time the lower hearths may be running on a low-grade or less highly sulfureted ore, which requires less time for its treatment and which may be rapidly disposed of. Thus different grades and kinds of ore may be roasted in the same furnace without interfering with each other. Furthermore, the furnace is so arranged that the heat on any one particular hearth may be intensified or lessened by means of the baffle-plates, which may be made to practically separate it entirely from the hearths above and below, the fumes being allowed to pass through the opening or even through a separate flue-piece. Furthermore, one hearth may be used alone for roasting a small quantity of ore, if desired, that hearth being separated from the others by the closing-pieces, or every hearth may be filled with ore at the same time and the openings in the floors of the hearths closed by the lids or closing-pieces described, so that all the ore in the furnace (about twenty-four tons in the ordinary-sized furnace) can be roasted at once without changing from one hearth to another, the rabbles running at any speed desired, according to the size of the pulleys used. The ore on each hearth can thus receive a continuous roast of twenty-four hours or more and can then be emptied from the entire furnace simultaneously, the rabble-plates acting in this instance as scrapers for each hearth. Furthermore, in this furnace the rabbles can be quickly and conveniently removed from the outside and changed for new ones or others with different-shaped blades, this ease of change or repair being one of the decided advantages of my invention. Other advantages of this furnace are that it requires less horsepower to operate it, because the rabbles are moved by power applied at the outer part of the rabble-frame, which is a decided advantage over the arrangement in which the hearths are revolved and the rabbles stationary, or the rabbles revolved by means of a central shaft, as is often done in furnaces of this kind. Furthermore, the propelling shaft and pulleys are entirely outside of the furnace, and therefore not subjected to the destructive influences of the heat and gases in the interior thereof. Still further, the operation of the furnace can be observed at all times and varied at will. For these and similar reasons the furnace may be used not only for roasting, but also for drying, heating, or calcining generally and as an open furnace for almost any kind of material that may require such treatment, such as coal or cement. The degree of heat may be modified. The furnace may be arranged to automatically fill and empty itself at any desired rate of speed. It is simple of construction, easy of operation, but little power is required to manipulate the ores, it is small, and any desired kind of heat or heated gases can be easily applied thereto.

Having thus described my invention, what I claim as new, and desire to secure by Letters Patent of the United States, is—

1. In a furnace, the combination of a wall or shell, a central support or pillar, a stationary hearth built upon and carried by said pillar and detached from said shell, a frame carrying means to stir the material on said hearth, and means for driving said frame from the outside of the furnace, said means contacting with said frame on the outside thereof, substantially as described.

2. In a furnace, the combination of a wall or shell, a centrally-arranged pillar or support, a series of stationary hearths one above the other built upon said pillar or support and separated from said shell, a movable frame, carrying rabbles, located above each hearth, and means for revolving said frame from the outside of the furnace, said means engaging said frames on the outside, substantially as described.

3. In a furnace, the combination of a wall or shell, a central pillar or support, a series of hearths built into and carried by said pillar located one above the other, each hearth being provided with an opening, means for closing said openings, a revolving rabble-frame above each hearth, and means for driving said rabble-frames from the outside of the furnace, said means engaging said frames on the outside thereof, substantially as described.

4. In a furnace, the combination of a wall or shell, a central pillar or support, a series of hearths built into and carried by said support located one above the other and separated from said shell, each of said hearths being provided with an opening and a discharge-apron, a revolving rabble-frame located above each of said hearths, and means for driving said rabble-frames from the outside of the furnace, said means being so arranged as to apply the power to said frames on the outer part thereof, substantially as described.

5. In a furnace, the combination of a wall or shell, a central pillar or support, a series of hearths built upon and carried by said pillar, one above the other and separated from said shell, a rabble-frame above each of said hearths composed of inner and outer collars and cross-arms carrying rabbles or rakes, antifriction devices for supporting each of said collars, and means for revolving said rabble-frames from the outside of the furnace, said means being so arranged as to apply the power to the outside collar of said frames, substantially as described.

6. In a furnace, the combination of a wall or shell, a central pillar or support, roasting-hearths built into and supported by said central pillar, one above another and separated from said shell, a movable rabble-frame mounted above each of said hearths, said rabble-frames consisting of inner and outer collars and cross-arms carrying blades or plows, said blades or plows being made of different sizes and so arranged on the respective arms of the frame as to travel in different paths, and means for driving said rabble-frames, said means being located outside of said furnace and passing through the wall thereof, substantially as described.

7. In a furnace, the combination of a wall or shell, a central pillar, a series of hearths carried by said pillar and separated from the wall or shell, each of said hearths being provided with a discharge-opening and with an apron pivoted to the hearth at one edge of said opening, a revolving rabble-frame located in proximity to each of said hearths, means located outside the furnace for revolving said rabble-frame, and connections between said means and the outside portion of said rabble-frame, substantially as described.

8. In a furnace, the combination of a wall or shell, a central pillar, a series of stationary hearths mounted on said pillar, each provided with a discharge-opening, and an apron hinged to said hearth at the edge of said opening, braces for supporting said hearths from said central pillar, means for closing the openings in said hearths, a movable rabble-frame located above each of said hearths, and provided with blades or plows of different sizes, means located outside of the furnace for driving said rabble-frames, and connections passing through said furnace between said means and the outside part of each of said rabble-frames, substantially as described.

9. In a furnace, the combination of an inclosing wall, a central pillar, hearths mounted one above the other on said pillar, each hearth being provided with a discharge slit or opening, a rabble-frame located above each of said hearths, said frame consisting of inner and outer collars, and arms connecting said collars provided with supporting blades or rakes, antifriction means for supporting each of said collars, a driving-shaft located on the outside of the furnace, and cords or chains passing through the wall of said furnace and encircling the outer collar of each of said rabble-frames, substantially as described.

In testimony whereof I have signed my name to this specification in the presence of two subscribing witnesses.

EDWARD O. C. ORD.

Witnesses:
BENJAMIN C. BRYAN,
FREDERICK B. HUBBELL.